(12) United States Patent
Hirasawa et al.

(10) Patent No.: US 11,262,645 B2
(45) Date of Patent: Mar. 1, 2022

(54) LENS SHIFT MECHANISM AND PROJECTION DISPLAY APPARATUS

(71) Applicant: Sony Corporation, Tokyo (JP)

(72) Inventors: Takeaki Hirasawa, Tokyo (JP); Takahiro Nagai, Fujisawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/265,558

(22) PCT Filed: Aug. 2, 2019

(86) PCT No.: PCT/JP2019/030487
§ 371 (c)(1),
(2) Date: Feb. 3, 2021

(87) PCT Pub. No.: WO2020/044955
PCT Pub. Date: Mar. 5, 2020

(65) Prior Publication Data
US 2021/0240062 A1    Aug. 5, 2021

(30) Foreign Application Priority Data

Aug. 31, 2018 (JP) .............................. JP2018-162440

(51) Int. Cl.
*G03B 21/14* (2006.01)
*G03B 21/20* (2006.01)

(52) U.S. Cl.
CPC ......... *G03B 21/142* (2013.01); *G03B 21/145* (2013.01); *G03B 21/2006* (2013.01)

(58) Field of Classification Search
CPC .............. G03B 21/142; G03B 21/2006; G03B 21/145; G03B 21/14

(Continued)

(56) References Cited

U.S. PATENT DOCUMENTS 7,551,377 B2 *  6/2009  Kuroki ..................... G02B 7/14
                                                    359/645
8,845,111 B2 *  9/2014  Furuichi .................. G03B 5/04
                                                    353/101

(Continued)

FOREIGN PATENT DOCUMENTS

JP    2005-157370 A    6/2005
JP    2006-301424 A    11/2006

(Continued)

OTHER PUBLICATIONS

International Search Report dated Sep. 17, 2019 in PCT/JP2019/030487 filed on Aug. 2, 2109, citing references AA, AB, and AO-AT therein, 2 pages.

*Primary Examiner* — William C. Dowling
(74) *Attorney, Agent, or Firm* — Oblon, McClelland, Maier & Neustadt, L.L.P.

(57) ABSTRACT

A lens shift mechanism of one embodiment of the present disclosure includes: a projection lens; a cylindrical housing that holds the projection lens; and an operating unit that moves the cylindrical housing in one axial direction perpendicular to an optical axis of the projection lens. The operating unit includes a pair of a main shaft and a countershaft extending in the one axial direction and disposed to be opposed to each other across the cylindrical housing, and a pair of elastic bodies provided respectively for the main shaft and the countershaft. The pair of elastic bodies are parallel to the one axial direction, and have biasing directions opposite to each other.

13 Claims, 11 Drawing Sheets

(58) Field of Classification Search
USPC .................................................. 353/100, 101
See application file for complete search history.

(56) References Cited

U.S. PATENT DOCUMENTS

| | | |
|---|---|---|
| 2005/0117127 A1 | 6/2005 | Jang |
| 2008/0080069 A1 | 4/2008 | Masuda |
| 2009/0219505 A1 | 9/2009 | Kitahara et al. |
| 2018/0088449 A1* | 3/2018 | Hatano .................. G02B 7/023 |

FOREIGN PATENT DOCUMENTS

| | | |
|---|---|---|
| JP | 2008-287292 A | 11/2008 |
| JP | 2009-175353 A | 8/2009 |
| JP | 2010-33095 A | 2/2010 |
| JP | 2010-97019 A | 4/2010 |
| JP | 2012230198 A | 11/2012 |
| JP | 2017-68179 A | 4/2017 |
| WO | WO-2013054426 A1 | 4/2013 |
| WO | WO-2018146985 A1 | 8/2018 |

* cited by examiner

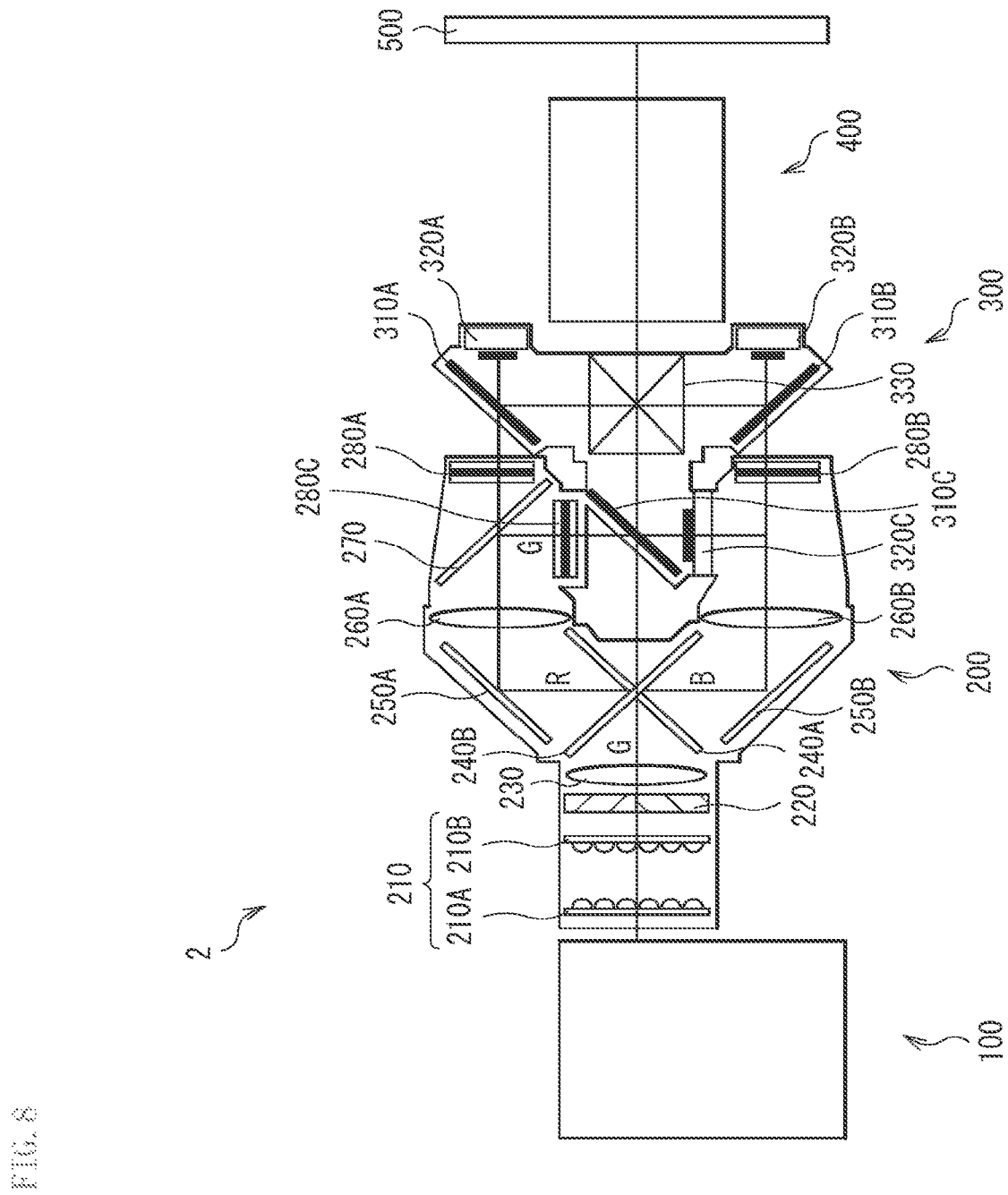

LENS SHIFT MECHANISM AND PROJECTION DISPLAY APPARATUS

TECHNICAL FIELD

The present disclosure relates to, for example, a lens shift mechanism that shifts a projection lens in a direction perpendicular to an optical axis in a projection display apparatus, and to a projection display apparatus using the same.

BACKGROUND ART

In general, a projection display apparatus (projector) that projects an image on a screen is to have a function of adjusting an image projected on the screen to a position desired by a user. For this reason, the projector is equipped, in its main body, with a lens shift apparatus that adjusts the position of the projection image by shifting a projection lens perpendicularly to an optical axis (horizontally and vertically).

Incidentally, the projector displays an image enlarged by the projection lens on the screen. Therefore, fine motions and rattling of the projection lens are converted into large motions of the projection image on the screen. For this reason, the projector is demanded of stability of the projection image position on the screen. However, a lens shift apparatus is generally provided with clearance for operating a projection lens, which can cause rattling of the projection lens. Therefore, it is demanded that a measure be developed to eliminate the rattling of the projection lens in the lens shift apparatus.

In view of this, for example, PTL 1 discloses a lens shift apparatus that, by a first spring (spring) mounted on a first engagement pin, crimps a lens supporter supporting a projection lens to a first supporter in an optical axis direction of the projection lens, to generate a frictional force to remove rattling, of the projection lens, perpendicular to the optical axis.

CITATION LIST

Patent Literature

PTL 1: Japanese Unexamined Patent Application Publication No. 2010-97019

SUMMARY OF THE INVENTION

Thus, in a projection display apparatus, it is demanded that a lens shift apparatus be developed that makes it possible to improve stability of a projection image position.

It is desirable to provide a lens shift mechanism and a projection display apparatus that make it possible to improve stability of a projection image position.

A lens shift mechanism of one embodiment of the present disclosure includes: a projection lens; a cylindrical housing that holds the projection lens; and an operating unit that moves the cylindrical housing in one axial direction perpendicular to an optical axis of the projection lens. The operating unit includes a pair of a main shaft and a countershaft extending in the one axial direction and disposed to be opposed to each other across the cylindrical housing, and a pair of elastic bodies provided respectively for the main shaft and the countershaft. The pair of elastic bodies are parallel to the one axial direction, and have biasing directions opposite to each other.

A projection display apparatus of one embodiment of the present disclosure includes: a light source unit; an image formation unit that includes a plurality of optical units including an optical modulator that modulates light from the light source unit on the basis of an input image signal; and a projection unit that projects image light generated by the image formation unit. The projection display apparatus includes, as the projection unit, the lens shift mechanism of one embodiment of the present disclosure described above.

In the lens shift mechanism of one embodiment of the present disclosure and the projection display apparatus of one embodiment, the operating unit that moves the projection lens in the one axial direction perpendicular to the optical axis includes the pair of the main shaft and the countershaft extending in the one axial direction and disposed to be opposed to each other across the cylindrical housing that holds the projection lens, in combination with the pair of elastic bodies parallel to the same one axial direction and having biasing directions opposite to each other. This reduces rattling of the projection lens in a planar direction perpendicular to the optical axis.

BRIEF DESCRIPTION OF DRAWINGS

FIG. 8 is a schematic diagram illustrating an example of a configuration of an optical system of a projection display apparatus according to one embodiment of the present disclosure.

MODES FOR CARRYING OUT THE INVENTION

Figure 1:
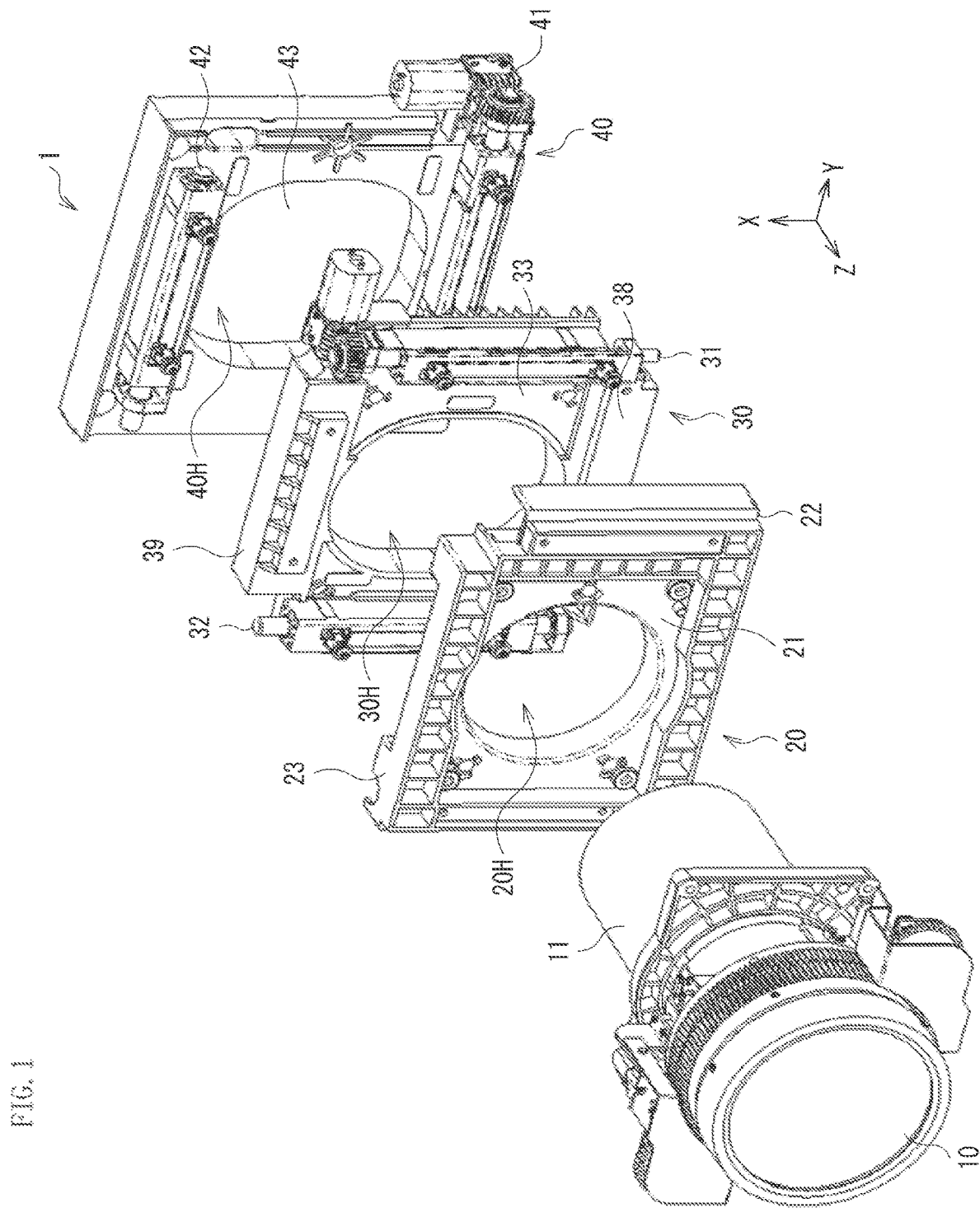
FIG. 1 is an exploded perspective view of a configuration of a lens shift mechanism according to one embodiment of the present disclosure.

In the following, description is given of embodiments of the present disclosure in detail with reference to the drawings. The following description is merely a specific example of the present disclosure, and the present disclosure should not be limited to the following embodiments. Moreover, the present disclosure is not limited to arrangements, dimensions, dimensional ratios, and the like of each component illustrated in the drawings. It is to be noted that the description is given in the following order.

1. Embodiment (Example of a Lens Shift Mechanism Including an Operating Unit in which Elastic Bodies Whose Biasing Directions are Opposite Directions to Each Other are Provided for a Main Shaft and a Countershaft)
1-1. Configuration of Lens Shift Mechanism
1-2. Operation of Lens Shift Mechanism
1-3. Workings and Effects
2. Application Examples
2-1. Application Example 1 (Example of a Projection Display Apparatus Using a Reflective Spatial Modulator)
2-2. Application Example 2 (Example of a Projection Display Apparatus Using a Transmissive Spatial Modulator)

1. Embodiment

Figure 2:
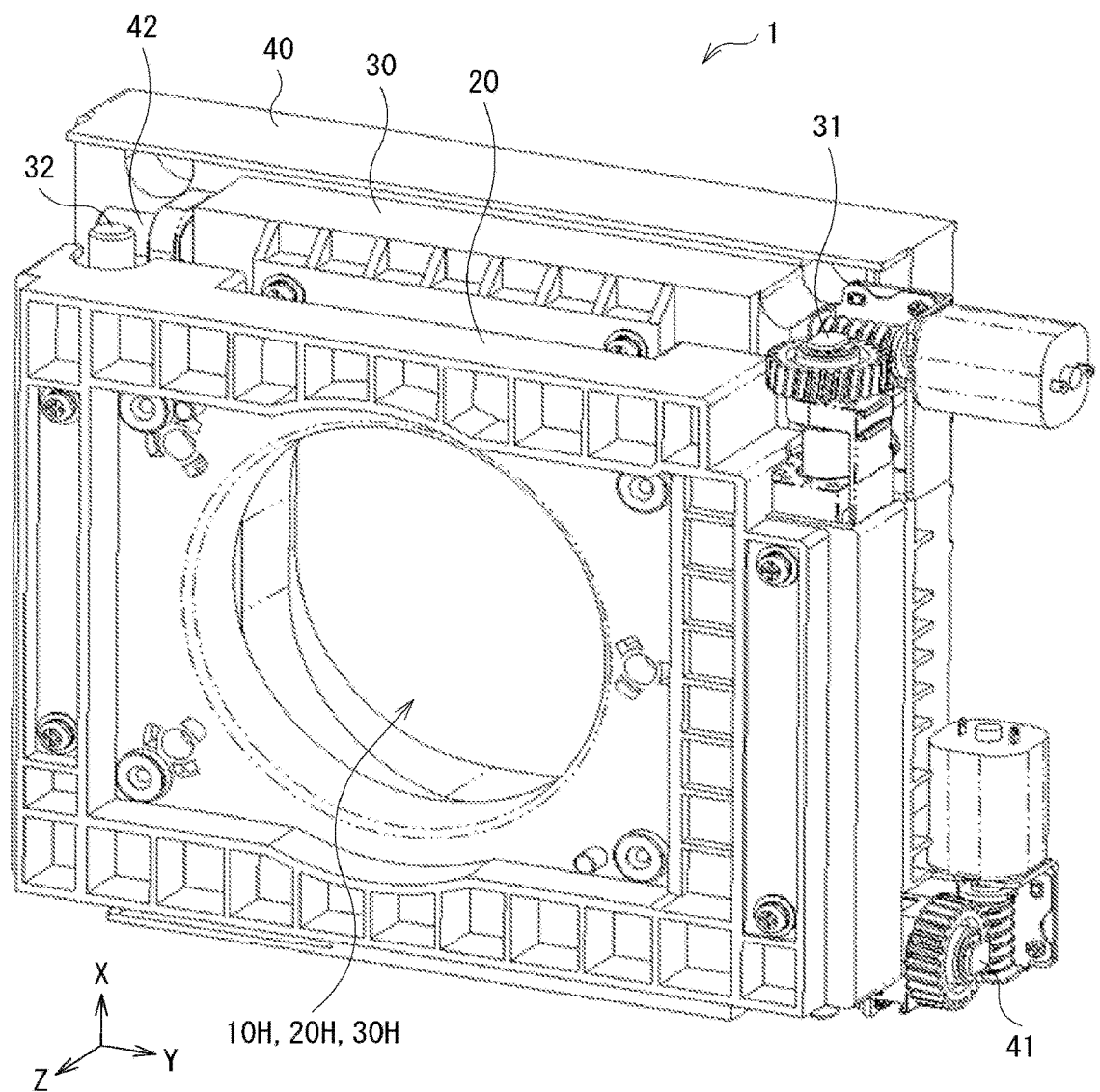
FIG. 2 is a perspective view of the lens shift mechanism integrated by combining members illustrated in FIG. 1.

FIG. 1 is an exploded perspective view of a lens shift mechanism (lens shift mechanism 1) according to one embodiment of the present disclosure. FIG. 2 is a perspective view of the lens shift mechanism 1 integrated by combining and coupling to each other the members illustrated in FIG. 1. The lens shift mechanism 1 is configured to, for example, shift a projection lens (projection lens 10) in a planar direction perpendicular to its optical axis, to adjust a projection image position, in a projection display apparatus to be described later (e.g., a projector 2, see FIG. 8).

1-1. Configuration of Lens Shift Mechanism

The lens shift mechanism 1 of the present embodiment includes the projection lens 10, a cylindrical housing 11 that holds the projection lens 10, a lens supporter 20 that supports the projection lens 10 via the cylindrical housing 11, an operating unit 30 (first operating unit), and an operating unit 40 (second operating unit) combined in this order. The operating unit 30 is configured to, for example, move the projection lens 10 having an optical axis in a Z-axis direction (specifically, for example, the lens supporter 20 to which the cylindrical housing 11 is removably fixed), in one direction (e.g., X-axis direction) perpendicular to the optical axis. The operating unit 30 includes, for example, a pair of a main shaft 31 and a countershaft 32 that extend in the X-axis direction and are disposed to be opposed to each other across the cylindrical housing 11. The main shaft 31 and the countershaft 32 are respectively provided with a pair of elastic bodies (springs 34 and 35) parallel to the X-axis direction and having biasing directions opposite to each other (see FIG. 3). The operating unit 40 is configured to, for example, move the projection lens 10 having the optical axis in the Z-axis direction, in another direction (e.g., Y-axis direction) perpendicular to the optical axis. The operating unit 30 includes, for example, a pair of a main shaft 41 and a countershaft 42 that extend in the Y-axis direction and are disposed to be opposed to each other across the cylindrical housing 11. The main shaft 41 and the countershaft 42 are respectively provided with a pair of elastic bodies (springs 44 and 45) parallel to the Y-axis direction and having biasing directions opposite to each other (see FIG. 4).

The lens supporter 20 includes, for example, a base 21 having a substantially rectangular shape and provided with an opening 20H. The base 21 is further provided with attachment portions 22 and 23 that couple the lens supporter 20 to the operating unit 30. The cylindrical housing 11 holding the projection lens 10 is inserted into the opening 20H. The opening 20H has, for example, substantially the same shape as an outer diameter 11R of the cylindrical housing 11. The attachment portions 22 and 23 are provided on respective two opposing sides of the base 21. As will be described in detail later, for example, the attachment portions 22 and 23 are fastened to accommodation portions 36 and 37 that respectively accommodate the main shaft 31 and the countershaft 32 of the operating unit 30, via screws (not illustrated), for example. The lens supporter 20 includes, for example, a light-shielding material having a thickness of 5 mm or more and 30 mm or less in the Z-axis direction, for example. Specifically, the lens supporter 20 is formed by die-casting using a non-ferrous metal such as aluminum (Al) or magnesium (Mg). Alternatively, the lens supporter 20 may be formed using, for example, a resin, carbon fiber, or the like.

Figure 3:
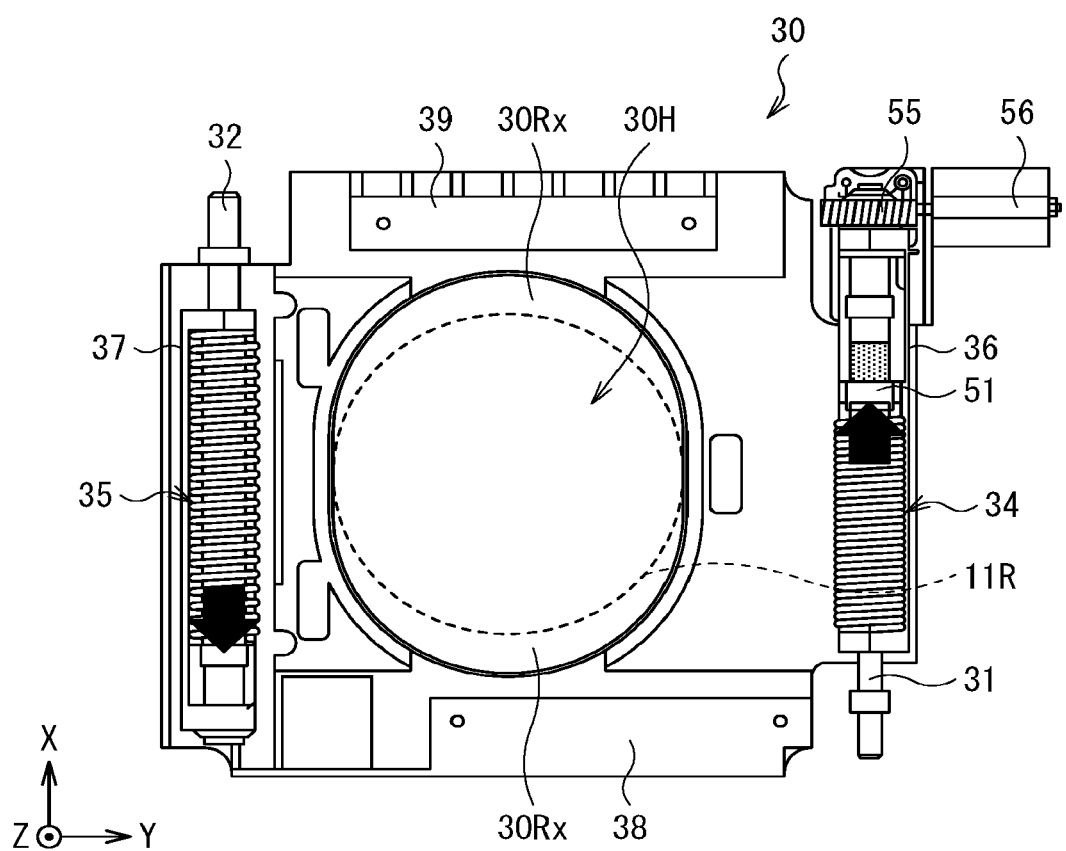
FIG. 3 is a plan view of one operating unit illustrated in FIG. 1.

The operating unit 30 is configured to move the projection lens 10 in one axial direction perpendicular to the optical axis. FIG. 3 illustrates an exemplary planar configuration of the operating unit 30. In the present embodiment, the operating unit 30 is configured to move, for example, the cylindrical housing 11 holding the projection lens 10, together with the lens supporter 20, in the X-axis direction, for example, perpendicular to the optical axis of the projection lens (e.g., Z-axis direction). The operating unit 30 includes, for example, the main shaft 31 and the countershaft 32, a base 33 having a substantially rectangular shape and provided with an opening 30H, and the pair of springs 34 and 35 provided for the main shaft 31 and the countershaft. The cylindrical housing 11 holding the projection lens 10 is inserted into the opening 30H, as with the opening 20H. The opening 30H has, for example, in the X-axis direction, a marginal region 30Rx in which the cylindrical housing 11 is movable, in addition to substantially the same circular shape as the outer diameter 11R of the cylindrical housing 11 (a dotted line in FIG. 3). The base 33 is further provided with the accommodation portions 36 and 37 that accommodate the main shaft 31 and the countershaft 32, respectively, and attachment portions 38 and 39 that couple the operating unit 30 to the operating unit 40.

The main shaft 31 and the countershaft 32 are provided along two opposing sides of the base 33, across the opening 30H, so that their extending directions are parallel to a movement direction of the projection lens 10 by the operating unit 30 (X-axis direction). Specifically, the main shaft 31 is accommodated together with the spring 34, in the accommodation portion 36 disposed along one of the two opposing sides of the base 33 that are parallel to the movement direction of the projection lens 10 by the operating unit 30, to be fixed to the base 33. The countershaft 32 is accommodated together with the spring 35, in the accommodation portion 37 disposed along the other of the two opposing sides of the base 33 that are parallel to the movement direction of the projection lens 10 by the operating unit 30, to be fixed to the base 33. The spring 34 and the spring 35 are provided for the main shaft 31 and the countershaft 32 so as to have biasing forces in opposite directions to each other, as indicated by arrows in FIG. 3. The main shaft 31 is partially provided with a thread 31X (see FIG. 5A), and the thread 31X is combined with a nut 51. The attachment portions 38 and 39 are disposed to be opposed to each other across the opening 30H, along two sides of the base 33 that are different from the two sides on which the accommodation portions 36 and 37 are provided. As will be described in detail later, the attachment portions 38 and 39 are fastened to accommodation portions 46 and 47 that respectively accommodate the main shaft 41 and the countershaft 42 of the operating unit 40, via screws (not illustrated), for example. This integrates the lens supporter 20, the operating unit 30, and the operating unit 40.

The base 33 includes, for example, a light-shielding material having a thickness of 5 mm or more and 30 mm or less in the Z-axis direction, for example. Specifically, the base 33 is formed by die-casting using a non-ferrous metal such as aluminum (Al) or magnesium (Mg). Alternatively, the base 33 may be formed using, for example, a resin, carbon fiber, or the like. The accommodation portions 36 and 37 and the attachment portions 38 and 39 provided on the base 33 may include, for example, the same material as the base 33, or a different material. In a case of using a different material, for example, it is preferable to use a sheet metal press part.

Figure 4:
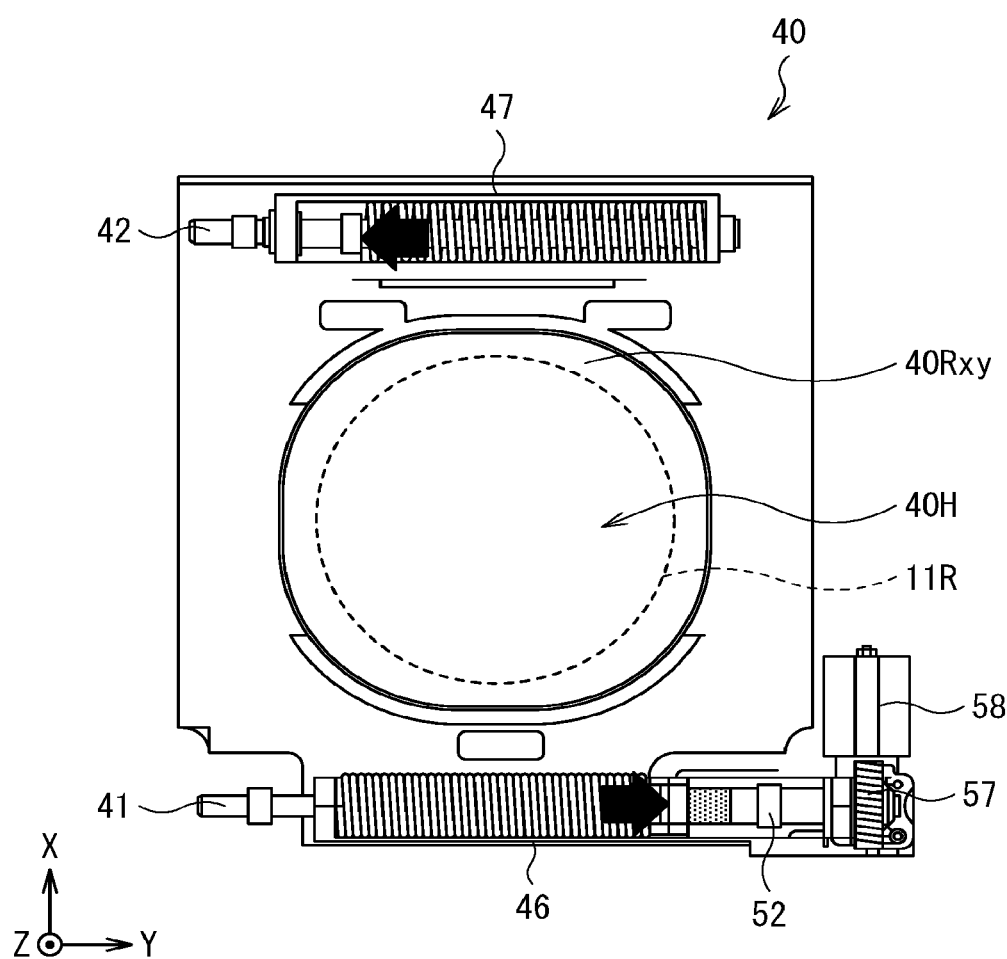
FIG. 4 is a plan view of another operating unit illustrated in FIG. 1.

The operating unit 40 is configured to move the projection lens 10 in one axial direction perpendicular to the optical axis. FIG. 4 illustrates an exemplary planar configuration of the operating unit 40. In the present embodiment, the operating unit 40 is configured to move, for example, the cylindrical housing 11 holding the projection lens 10, together with the lens supporter 20 and the operating unit 30, in the Y-axis direction, for example, perpendicular to the optical axis of the projection lens (e.g., Z-axis direction). The operating unit 40 includes, for example, the main shaft 41 and the countershaft 42, a base 43 having a substantially rectangular shape and provided with an opening 40H, and the pair of springs 44 and 45 provided for the main shaft 41 and the countershaft 42. The cylindrical housing 11 holding the projection lens 10 is inserted into the opening 40H, as with the openings 20H and 30H. The opening 40H has, for example, in addition to substantially the same circular shape as the outer diameter 11R of the cylindrical housing 11 (a dotted line in FIG. 4), a surrounding marginal region 40Rxy in which the cylindrical housing 11 is movable on a XY plane. The base 43 is further provided with the accommodation portions 46 and 47 that accommodate the main shaft 41 and the countershaft 42, respectively.

The main shaft 41 and the countershaft 42 are provided along two opposing sides of the base 43, across the opening 40H, so that their extending directions are parallel to a movement direction of the projection lens 10 by the operating unit 40 (Y-axis direction). Specifically, the main shaft 41 is accommodated together with the spring 44, in the accommodation portion 46 disposed along one of the two opposing sides of the base 43 that are parallel to the movement direction of the projection lens 10 by the operating unit 40, to be fixed to the base 43. The countershaft 42 is accommodated together with the spring 45, in the accommodation portion 47 disposed along the other of the two opposing sides of the base 43 that are parallel to the movement direction of the projection lens 10 by the operating unit 40, to be fixed to the base 43. The spring 44 and the spring 45 are provided for the main shaft 41 and the countershaft 42 so as to have biasing forces in opposite directions to each other, as indicated by arrows in FIG. 4. The main shaft 41 is partially provided with a thread 41X (see FIG. 5A), and the thread 41X is combined with a nut 52.

The base 43 includes, for example, a light-shielding material having a thickness of 5 mm or more and 30 mm or less in the Z-axis direction, for example. Specifically, the base 43 is formed by die-casting using a non-ferrous metal such as aluminum (Al) or magnesium (Mg). Alternatively, the base 43 may be formed using, for example, a resin, carbon fiber, or the like. The accommodation portions 46 and 47 provided on the base 43 may include, for example, the same material as the base 43, or a different material. In a case of using a different material, for example, it is preferable to use a sheet metal press part.

Figure 5A:
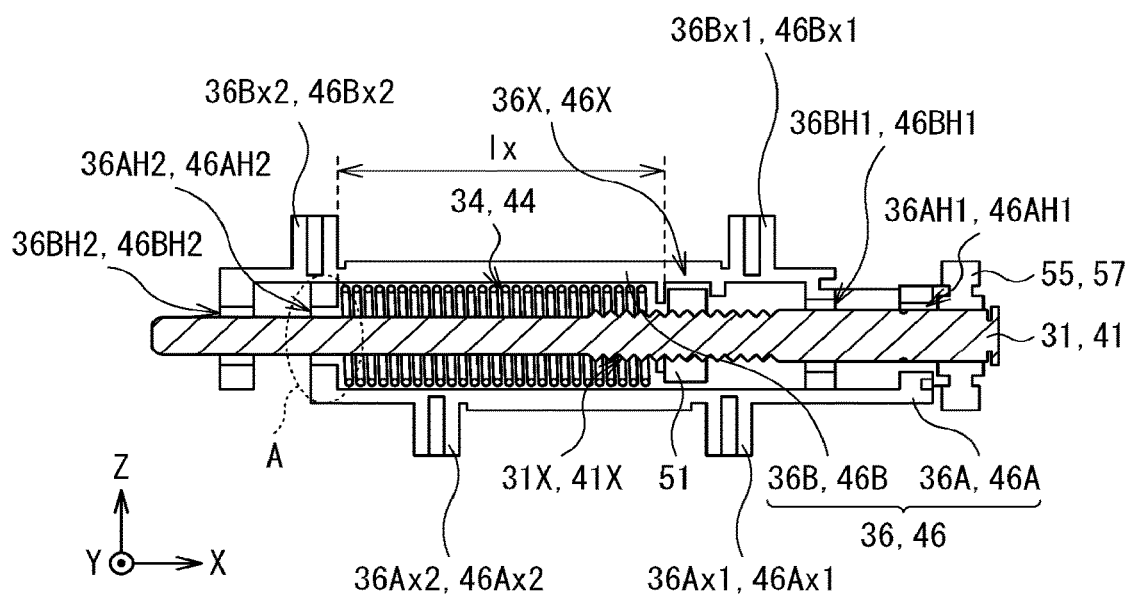
FIG. 5A is a cross-sectional view of a configuration of main shafts and their peripheral members illustrated in FIG. 1.
Figure 5B:
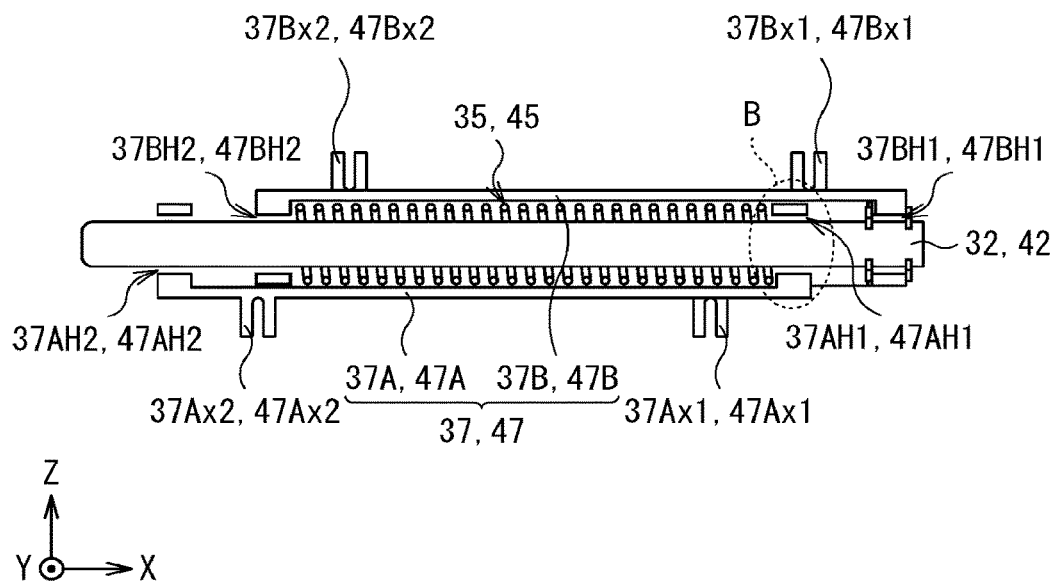
FIG. 5B is a cross-sectional view of a configuration of countershafts and their peripheral members illustrated in FIG. 1.

Detailed description will now be given on the main shafts 31 and 41 and the countershafts 32 and 42 and their peripheral members provided in the operating unit 30 and the operating unit 40. FIG. 5A illustrates a cross-sectional configuration of the main shafts 31 and 41 and their peripheral members, and FIG. 5B illustrates a cross-sectional configuration of the countershafts 32 and 42 and their peripheral members. In the following, description will be given typically using the reference numerals of the main shaft 31 and the countershaft 32 and their peripheral members provided in the operating unit 30.

The main shaft 31 is configured to guide the movement direction of the projection lens 10 in one axial direction (here, the X-axis direction). The main shaft 31 includes, for example, a high-strength material having high wear resistance during sliding. Specifically, the main shaft 31 includes stainless steel (SUS), brass, or the like. The main shaft 31 has, for example, a diameter of 5φ or more and 10φ or less. The main shaft 31 preferably has a length, for example, longer than a longitudinal direction of the opening 30H provided with the marginal region 30Rx, and making allowance for an operating range. The main shaft 31 is provided with the spring 34 having a coiled shape, for example. Specifically, the main shaft 31 penetrates a space inside the coiled spring 34. Further, as described above, the main shaft 31 is partially provided with the thread 31X, and the nut 51 is attached to the thread 31 portion. Furthermore, for example, a gear 55 is attached to one end of the main shaft 31, and a motor 56 is coupled to the gear 55. The gear 55 is rotated by drive of the motor 56, and the main shaft 31 to which the gear 55 is attached also rotates together.

The accommodation portion 36 is configured to accommodate the main shaft 31 and the spring 34 and to fix the main shaft 31 to the base 33. The accommodation portion 36 includes, for example, a fixed portion 36A that is fixed to the base 33, and a cover 36B that covers the fixed portion 36A. The cover 36B is configured to slide relative to the fixed portion 36A. The fixed portion 36A and the cover 36B are provided with openings 36AH1, 36AH2, 36BH1, and 36BH2 larger than the diameter of the main shaft 31, on respective side surfaces opposing in a sliding direction of the cover 36B (e.g., X-axis direction). The main shaft 31 penetrates these openings 36AH1, 36AH2, 36BH1, and 36BH2, from side of the gear 55 attached to the main shaft 31 (right direction in FIG. 5A), for example, in the order of the opening 36AH1, the opening 36BH1, the opening 36AH2, and the opening 36BH2. This makes the cover 36B operable along the main shaft 31. Further, the inside of the cover 36B is provided with, at a predetermined position, a fixing groove 36X in which the nut 51 attached to the main shaft 31 is fitted. The outside of the fixed portion 36A is provided with, for example, two fastening portions 36Ax1 and 36Ax2 that are fixed to the base 33 by screws (not illustrated), for example. The outside of the cover 36B is provided with, for example, two fastening portions 36Bx1 and 36Bx2 to which the attachment portion of the lens supporter 20 (e.g., the attachment portion 22) is fastened.

The countershaft 32 is configured to hold the movement direction of the projection lens 10 in one axial direction (here, the X-axis direction) in combination with the main shaft 31. The countershaft 32 includes, for example, a high-strength material having high wear resistance during sliding. Specifically, the countershaft 32 includes stainless steel (SUS), brass, or the like. The countershaft 32 has, for example, a diameter of 5φ or more and 10φ or less. The countershaft 32 preferably has a length, for example, longer than the longitudinal direction of the opening 30H provided with the marginal region 30Rx, and making allowance for an operating range. The countershaft 32 is provided with the spring 35 having a coiled shape, for example. Specifically, the countershaft 32 penetrates a space inside the coiled spring 35.

The accommodation portion 37 is configured to accommodate the countershaft 32 and the spring 35 and to fix the countershaft 32 to the base 33. The accommodation portion 37 includes, for example, a fixed portion 37A that is fixed to the base 33, and a cover 37B that covers the fixed portion 37A. The cover 37B is configured to slide relative to the fixed portion 37A. The fixed portion 37A and the cover 37B are provided with openings 37AH1, 37AH2, 37BH1, and 37BH2 larger than the diameter of the countershaft 32, on respective side surfaces opposing in a sliding direction of the cover 37B (e.g., X-axis direction). The countershaft 32 penetrates these openings 37AH1, 37AH2, 37BH1, and 37BH2, from the right direction of FIG. 5B, for example, in the order of the opening 37BH1, the opening 37AH1, the opening 37BH2, and the opening 37AH2. This makes the cover 37B operable along the countershaft 32. The outside of the fixed portion 37A is provided with, for example, two fastening portions 37Ax1 and 37Ax2 that are fixed to the base 33 by screws (not illustrated), for example. The outside of the cover 37B is provided with, for example, two fastening portions 37Bx1 and 37Bx2 to which the attachment portion of the lens supporter 20 (e.g., the attachment portion 23) is fastened.

It is to be noted that the accommodation portion 46 that accommodates the main shaft 41 and the spring 44 and the accommodation portion 47 that accommodates the countershaft 42 and the spring 45 have a configuration similar to that of the main shaft 31 and the countershaft 32 and their peripheral members described above, except that, as described above, the guide direction (here, the Y-axis direction) of the projection lens 10 by the main shaft 41 and the countershaft 42 is different, and the description thereof will therefore be omitted.

1-2. Operation of Lens Shift Mechanism

Next, an operation mechanism of the lens shift mechanism 1 will be described. In the lens shift mechanism 1 of the present embodiment, as described above, the projection lens 10 the lens supporter 20 via the cylindrical housing 11, the operating unit 30, and the operating unit 40 are combined in this order, and are integrated by fastening the lens supporter 20 to the operating unit 30 and the operating unit 30 to the operating unit 40. Specifically, in regard to the lens supporter 20, the attachment portion 22 provided on the base 21 is fastened to the fastening portions 36Bx1 and 36Bx2 of the cover 36B of the accommodation portion 36 accommodating the main shaft 31 of the operating unit 30, and the attachment portion 23 is fastened to the fastening portions 37Bx1 and 37Bx2 of the cover 37B of the accommodation portion 37 accommodating the countershaft 32 of the operating unit 30, by screws (not illustrated), for example. In regard to the operating unit 30, the attachment portion 38 provided on the base 33 is fastened to fastening portions 46Bx1 and 46x2 of a cover 46B of the accommodation portion 46 accommodating the main shaft 41 of the operating unit 40, and the attachment portion 39 is fastened to fastening portions 47Bx1 and 47Bx2 of a cover 47B of the accommodation portion 47 accommodating the countershaft 42 of the operating unit 40, by screws (not illustrated), for example. Thus, the lens supporter 20 is moved in the X-axis direction by rotating the main shaft 31 of the operating unit 30, and the operating unit 30 is moved mainly in the Y-axis direction with the lens supporter 20 by rotating the main shaft of the operating unit 40.

In the following, the operation mechanism of the lens shift mechanism will be described, taking as an example the movement of the lens supporter 20 using the main shaft 31 and the countershaft 32 provided in the operating unit 30.

Figure 6A:
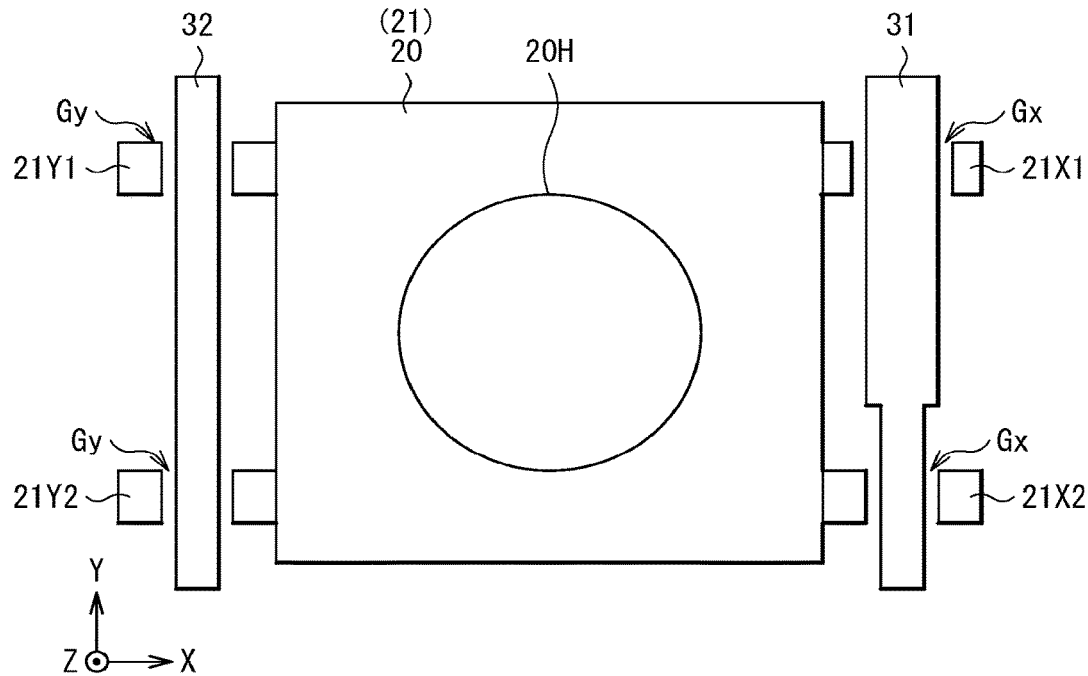
FIG. 6A is a schematic plan diagram for explaining an operation mechanism of the lens shift mechanism illustrated in FIG. 1.

FIG. 6A is a plan diagram schematically illustrating the main shaft 31 and the countershaft 32 and the lens supporter 20 assuming a state in which no biasing force is applied by the elastic bodies. Expansion portions 21X1, 21X2, 21Y1, and 21Y2 provided at four corners of the base 21 of the lens supporter 20 respectively correspond to the positions of the fastening portions 36Bx1, 36Bx2, 37Bx1, and 37Bx2 provided on the covers 36B and 37B of the operating unit 30 and fastened to the attachment portions 22 and 23 of the lens supporter 20. That is, the expansion portion 21X1 corresponds to the fastening portion 36Bx1, the expansion portion 21X2 corresponds to the fastening portion 36Bx2, the expansion portion 21Y1 corresponds to the fastening portion 37Bx1, and the expansion portion 21Y2 corresponds to the fastening portion 37B2. Further, a gap Gx is provided between the expansion portions 21X1 and 21X2 and the main shaft 31, and a gap Gy is provided between the expansion portions 21Y1 and 21Y2 and the countershaft 32. The gaps Gx and Gy are clearances provided to move the lens supporter 20 in the X-axis direction by the operating unit 30. Specifically, the gap Gx corresponds to a difference between the diameter of the main shaft 31 and the diameters of the openings 36AH1, 36AH2, 36BH1, and 36BH2 provided on the fixed portion 31A and the cover 36B of the accommodation portion 36. Specifically, the gap Gy corresponds to a difference between the diameter of the countershaft 32 and the diameters of the openings 37AH1, 37AH2, 37BH1, and 37BH2 provided on the fixed portion 32A and the cover 37B of the accommodation portion 37.

Figure 6B:
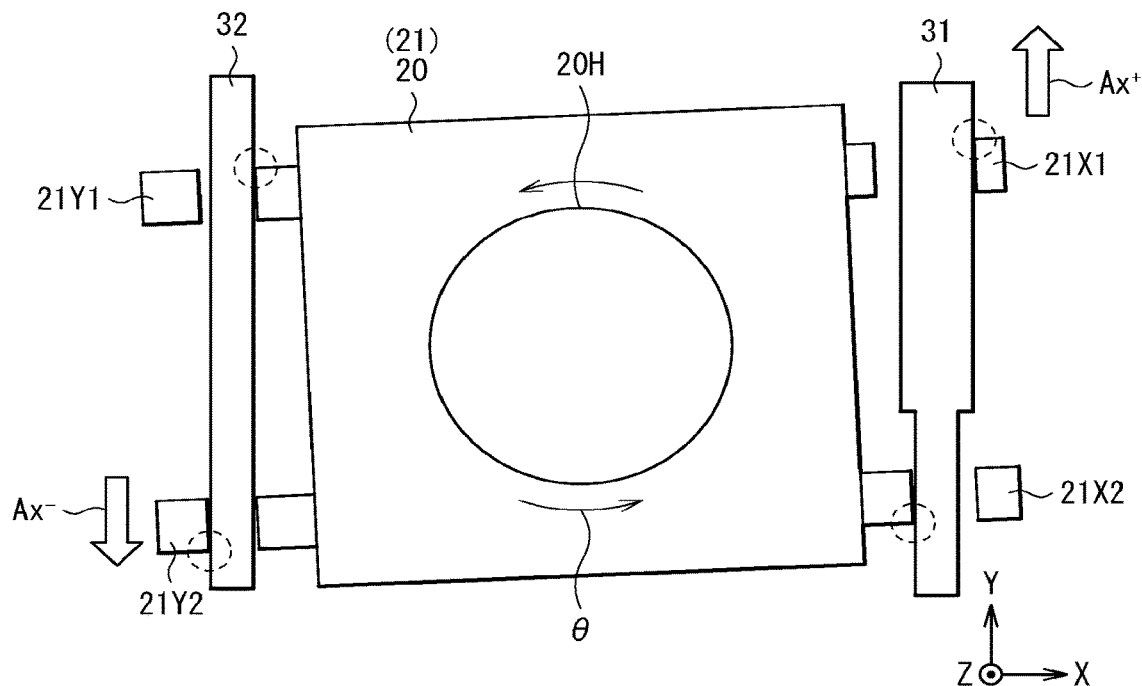
FIG. 6B is a schematic plan diagram for explaining an operation mechanism of the lens shift mechanism illustrated in FIG. 1.

FIG. 6B is a plan diagram schematically illustrating a state in which biasing forces are applied in opposite directions to each other by the springs 34 and 35. In the lens shift mechanism 1 of the present embodiment, the main shaft 31 and the countershaft 32 are each fixed to the base 33 so that its position relative to the operating unit 30 (the base 33) does not change. Therefore, when the main shaft 31 is rotated, the nut 51 attached to the thread 31X provided on the main shaft 31 moves in a predetermined direction on the X-axis (e.g., the left direction of FIG. 5A (negative direction)). Along with this, the covers 36B and 37B and the lens supporter 20 fastened to the covers 36B and 37B move in the same direction as the nut 51 on the X-axis.

Furthermore, at this time, a distance lx between the side surface of the fixed portion 36A accommodating the spring 34, and the nut 51 changes. Thus, the spring 34 is deformed, and a magnitude of the bias applied to the nut 51 on the operating side changes. Further, along with this, the magnitude of the bias applied to the side surface of the cover 37B on the operating side by the spring 35 combined with the countershaft 32 also changes. Therefore, as illustrated in FIG. 6B, the biasing forces of the springs 34 and 34 are applied respectively to the lens supporter 20 fastened to the main shaft 31 side on the right side of the drawing, in an arrow Ax$^+$ direction (positive direction on the X-axis), and to the lens supporter 20 fastened to the countershaft 32 side on the left side of the drawing, in an arrow Ax$^-$ direction (negative direction on the X-axis). The base 21 of the lens supporter 20 is thus rotated in a θ direction around the projection lens 10. As a result of this rotation, the main shaft 31 contacts the expansion portions 21X1 and 21X2 (specifically, the openings 36AH1, 36AH2, 36BH1, and 36BH2), and the countershaft 32 contacts the expansion portions 21Y1 and 21Y2 (specifically, the openings 37AH1, 37AH2, 37BH1, and 37BH2), in circles illustrated in FIG. 6B. This reduces rattling in the X-axis direction due to the clearances (the gaps Gx and Gy). That is, by providing the main shaft 31 and the countershaft 32, respectively, with the pair of springs 34 and 35 having opposite biasing directions, it is possible to reduce the rattling in the planar direction (XY plane direction) perpendicular to the optical axis of the projection lens 10 (Z-axis direction).

Figure 7A:
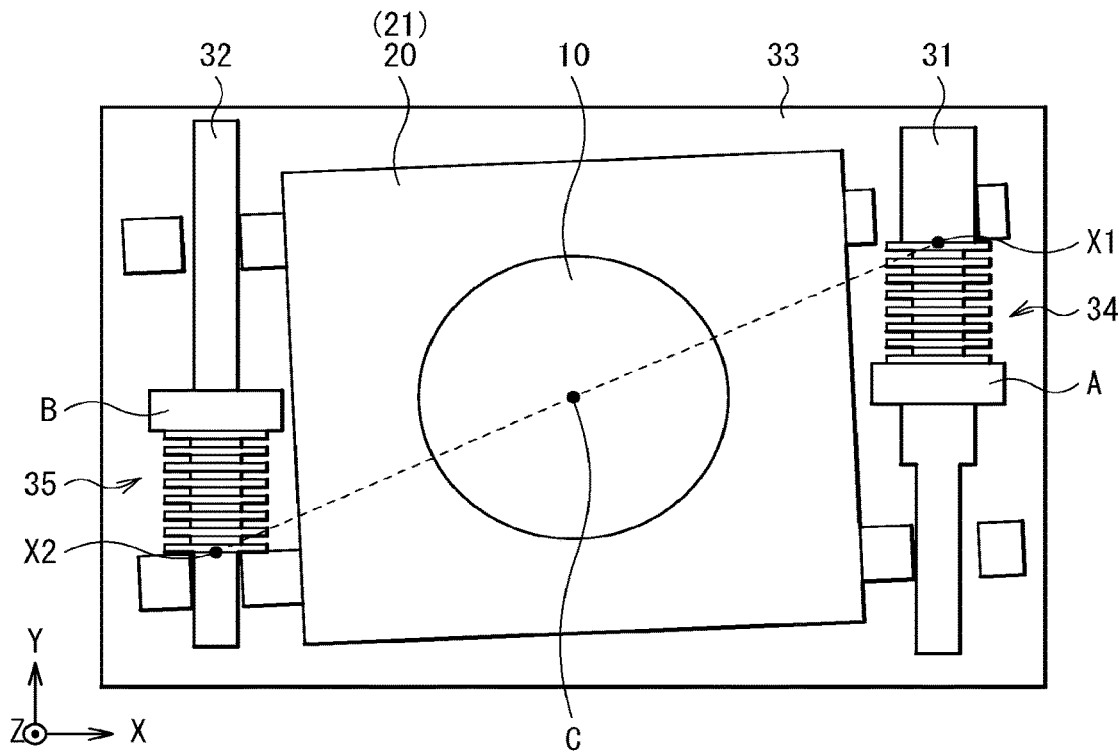
FIG. 7A is a schematic plan diagram illustrating an example of a positional relationship between a lens supporter and the operating units illustrated in FIG. 1.

Next, strength of the springs 34 and 35 provided for the main shaft 31 and the countershaft 32 will be described. FIG. 7A schematically illustrates an exemplary positional relationship between the lens supporter 20 and the operating unit 30. It is to be noted that a member A provided for the main shaft 31 of the operating unit 30 corresponds to the side surface of the fixed portion 36A in contact with the spring 34 ("A" in FIG. 5A), and a member B provided for the countershaft 32 of the operating unit 30 corresponds to the side surface of the fixed portion 37A in contact with the spring 35 ("B" in FIG. 5B).

In the lens shift mechanism 1 of the present embodiment, as described above, by rotating the main shaft 31 fixed to the base 33 side, the nut 51 combined with the main shaft 31 moves together with the cover 36B, and the distance lx between the side surface of the fixed portion 36A and the nut 51, which defines the length of the spring 34, changes. Thus, the spring 34 is deformed, and the magnitude of the bias (biasing force) applied to the nut 51 and the side surface of the fixed portion 36A changes. On the countershaft 32 side, the cover 37B on the countershaft 32 side, which is fastened to the base 21 of the lens supporter 20, also moves, in accordance with the motion of the cover 36B on the main shaft 31 side. This results in a change in a distance between the side surface of the fixed portion 37A and the side surface of the cover 37B in contact with the spring 35, which defines the length of the spring 35 provided for the countershaft 32. Thus, the spring 35 is deformed, and the magnitude of the bias applied to the side surface of the fixed portion 37A and the side surface of the cover 37B in contact with the spring 35 changes.

Figure 7B:
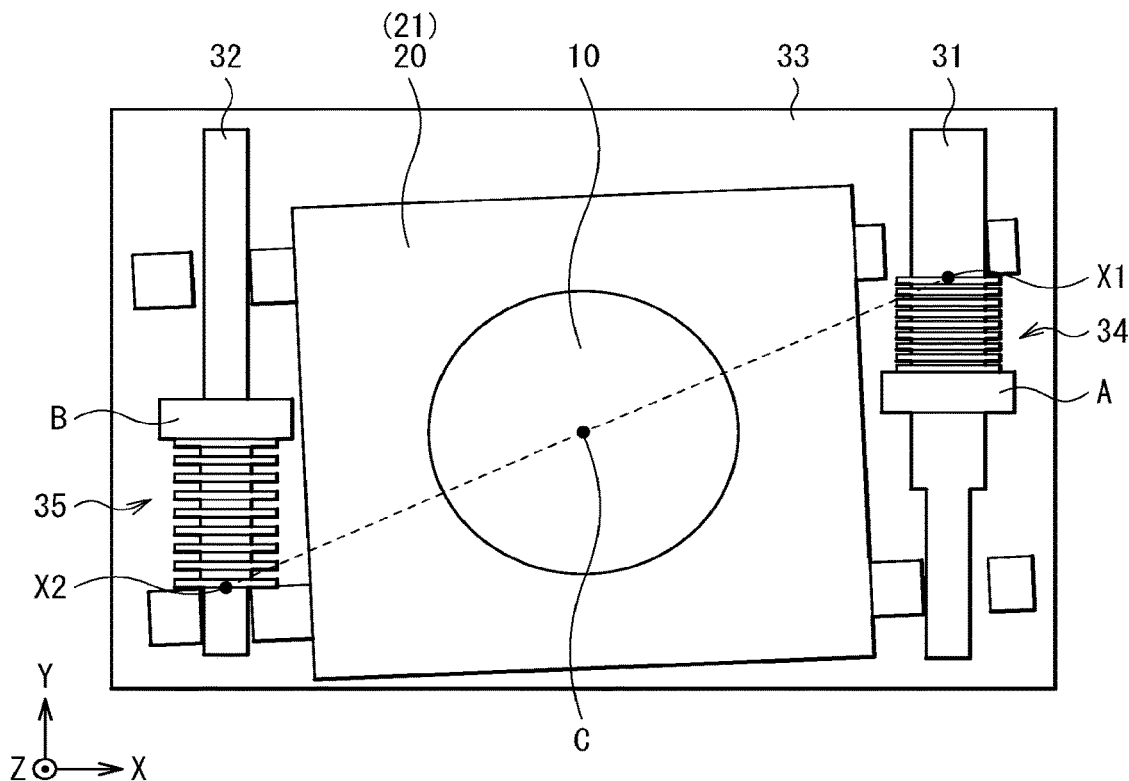
FIG. 7B is a schematic plan diagram illustrating another example of the positional relationship between the lens supporter and the operating units illustrated in FIG. 1.
Figure 7C:
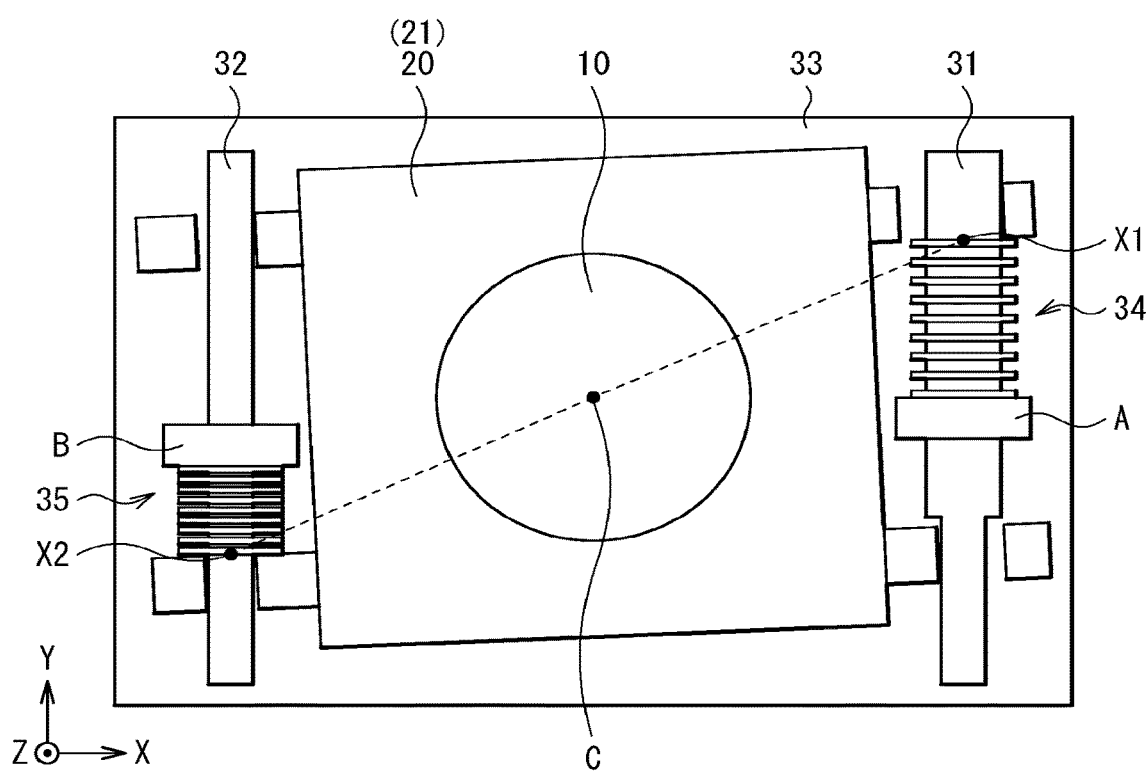
FIG. 7C is a schematic plan diagram illustrating another example of the positional relationship between the lens supporter and the operating units illustrated in FIG. 1.

FIG. 7B illustrates a state in which the lens supporter 20 is moved downward with respect to the main shaft 31 and the countershaft 32 in FIG. 7B. FIG. 7C illustrates a state in which the lens supporter 20 is moved upward with respect to the main shaft 31 and the countershaft 32 in FIG. 7C, which is the opposite of FIG. 7B. As illustrated in FIG. 7B, in the state in which the lens supporter 20 is moved downward, the spring 34 provided for the main shaft 31 is compressed and its biasing force (repulsive force) is in a high state, whereas the spring 35 provided for the countershaft 32 is stretched and its biasing force (repulsive force) is in a low state. In contrast, as illustrated in FIG. 7C, in the state in which the lens supporter 20 is moved upward, the spring 34 provided for the main shaft 31 is stretched and its biasing force (repulsive force) is in a low state, whereas the spring 35 provided for the countershaft 32 is compressed and its biasing force (repulsive force) is in a high state.

Incidentally, in a case of moving the lens supporter 20 from above to below or from below to above with respect to the main shaft 31 and the countershaft 32, force balance between the spring 34 and the spring 35 changes midway through the movement. If, during the change in the force balance between the spring 34 and the spring 35, the total force including gravitational force is swapped in a vertical direction, pressing directions of the spring 34 and the spring 35 change, which can make the motion of the lens supporter 20 unstable at that moment. To stabilize the motion of the lens supporter 20, it is desirable to set the strength of the spring 34 and the spring 35 so that the biasing force of either one of the spring 34 and the spring 35 is higher at all times, regardless of the position of the lens supporter 20 with respect to the main shaft 31. Specifically, for example, the biasing forces of the spring 34 provided for the main shaft 31 and the spring 35 provided for the countershaft 32 are set to satisfy the following expression (1). Thus, as illustrated in FIG. 7B and FIG. 7C, the lens supporter 20 is inclined upward on the right side of the drawing and inclined downward on the left side of the drawing, regardless of the position of the lens supporter 20 with respect to the main shaft 31, which stabilizes the motion of the lens supporter 20.

(Math. 1) A minimum biasing force of the spring 34>a maximum biasing force of the spring 35+gravitational force of the whole movement member　　　(1)

It is to be noted that the whole movement member in the above expression (1) refers to all members configuring the lens supporter 20, including the projection lens 10 and the cylindrical housing 11. Further, although the spring 34 provided for the main shaft 31 has a higher biasing force at all times in the above expression (1), the present invention is not limited to this, and the spring 35 provided for the countershaft 32 may have a higher biasing force at all times.

Positions biased by the spring 34 and the spring 35 will now be described. The positions at which the biasing forces of the spring 34 and the spring 35 are applied is preferably adjusted so that an optical axis center C of the projection lens 10 is disposed near a straight line coupling a point biased by the spring 34 (for example, a biased point X1 in FIG. 7A) and a point biased by the spring 35 (for example, a biased point X2 in FIG. 7A). Thus, a rotational center of the rotation of the lens supporter 20 by the biasing forces of the springs 34 and 34 substantially matches the optical axis of the projection lens 10. In general, a projection lens is formed point-symmetrically with respect to the optical axis center. Therefore, even if the projection lens rotates around the optical axis center, the rotation does not affect a projection image. This enables stable projection of an image, even if biasing forces applied from the spring 34 and the spring 35 fluctuate.

1-3. Workings and Effects

A projector that projects an image on a screen is to have a function of adjusting a position of an image projected on the screen to a position desired by a user. The projector is generally equipped, in its main body, with a lens shift apparatus that adjusts the position of the image by shifting a position of a projection lens perpendicularly to an optical axis (horizontally and vertically).

Incidentally, the projector displays an image enlarged by the projection lens on the screen. Therefore, fine motions and rattling of the projection lens are converted into large motions of the projection image on the screen. For example, if a liquid crystal panel having a size of 1 is used to project an image having a size of 300 on a screen, a motion of 10 mm or more is caused on the screen by the projection lens moving only 0.1 mm, because the motion of the projection lens is enlarged by a factor of 100 or more to be displayed as the projection image. For this reason, the projector is demanded of stability of the projection image position, and the projection lens is to be held at a precise position.

However, the lens shift apparatus is provided with clearance for operating a projection lens, which can cause rattling. Therefore, to hold the projection lens at a precise position, it is demanded that a method be developed to eliminate the rattling of the projection lens caused by the lens shift apparatus.

As described above, as a method to eliminate the rattling, a method is considered in which a spring is installed in the optical axis direction of the projection lens, and a frictional force is generated by the spring pressing a lens supporter that supports the projection lens in the optical axis direction, to eliminate the rattling of the projection lens perpendicular to the optical axis. However, this method can involve the following concerns.

For example, as the first concern, in a case where a load such as vibration or impact exceeding the frictional force is generated, the position of the projection lens moves, which can make the precise position unable to be kept. It is therefore demanded that a larger frictional force be set. As the second concern, when the projection lens is driven, a large force that exceeds the frictional force is used. This results in disadvantages, for example, an increase in the load on a drive mechanism, such as a motor, that moves the projection lens, a decrease in movement speed of the projection lens, and an increase in drive noise.

In contrast, in the lens shift mechanism 1 of the present embodiment, as the operating unit 30 that moves the projection lens 10 held by the cylindrical housing 11, in one axial direction (e.g., X-axis direction) perpendicular to the optical axis (e.g., Z-axis direction), the main shaft 31 and the countershaft 32 extending in the same one axial direction (X-axis direction) are disposed to be opposed to each other across the cylindrical housing 11, and the springs 34 and 35 having biasing directions opposite to each other are combined with the main shaft 31 and the countershaft 32, respectively. Thus, it is possible to reduce the rattling in the planar (XY plane) direction perpendicular to the optical axis (Z-axis direction).

As described above, in the present embodiment, the lens supporter 20 that supports the cylindrical housing 11 holding the projection lens 10 is moved perpendicularly to the optical axis of the projection lens 10 (e.g., Z-axis direction), for example, in the X-axis direction. The movement is performed by the operating unit 30 including the main shaft 31 and the countershaft 32 extending in the X-axis direction, disposed to be opposed to each other across the cylindrical housing 11, and respectively combined with the springs 34 and 35 having biasing directions opposite to each other. Thus, it is possible to reduce the rattling in the direction (e.g., XY plane) perpendicular to the optical axis (Z-axis direction), and improve stability of the position of an image projected from the projection lens 10.

Further, in the present embodiment, in addition to the operating unit 30 described above, the operating unit 40 including the main shaft 41 and the countershaft 42 extending in the Y-axis direction, disposed to be opposed to each other across the cylindrical housing 11, and respectively combined with the springs 44 and 45 having biasing directions opposite to each other is provided. The operating unit 40 is used to perform the movement of the lens supporter 20 in the Y-axis direction, which makes it possible to freely move the projection lens 10 in the XY plane without rattling.

Furthermore, in the lens shift mechanism 1 of the present embodiment, as compared with the lens shift mechanism described above, it is possible to reduce the rattling in the direction perpendicular to the optical axis, without burdening a support member or the like of the projection lens. Therefore, it is possible to reduce the load on the lens supporter and a drive mechanism, such as a motor, used to move the projection lens (in the present embodiment, the lens supporter 20 and, for example, motors 56 and 58 and gears 55 and 57 used to rotate the main shaft 31 and the main shaft 41 provided in the operating unit 30 and the operating unit 40). This makes it possible to improve reliability of the lens shift mechanism 1. Furthermore, it is possible to also improve quietness.

2. Application Examples

2-1. Application Example 1

FIG. 8 illustrates a reflective 3LCD-type projection display apparatus (the projector 2) that performs optical modulation using a reflective liquid crystal panel. The projector 2 includes a light source apparatus 100, an illumination optical system 200, an image formation unit 300, and a projection optical system 400 (projection optical system). It is to be noted that the projector 2 of the present disclosure may also be applied to a projector using a transmissive liquid crystal panel, a digital micromirror device (DMD: Digital Micromirror Device), or the like, instead of the reflective liquid crystal panel.

Figure 9:
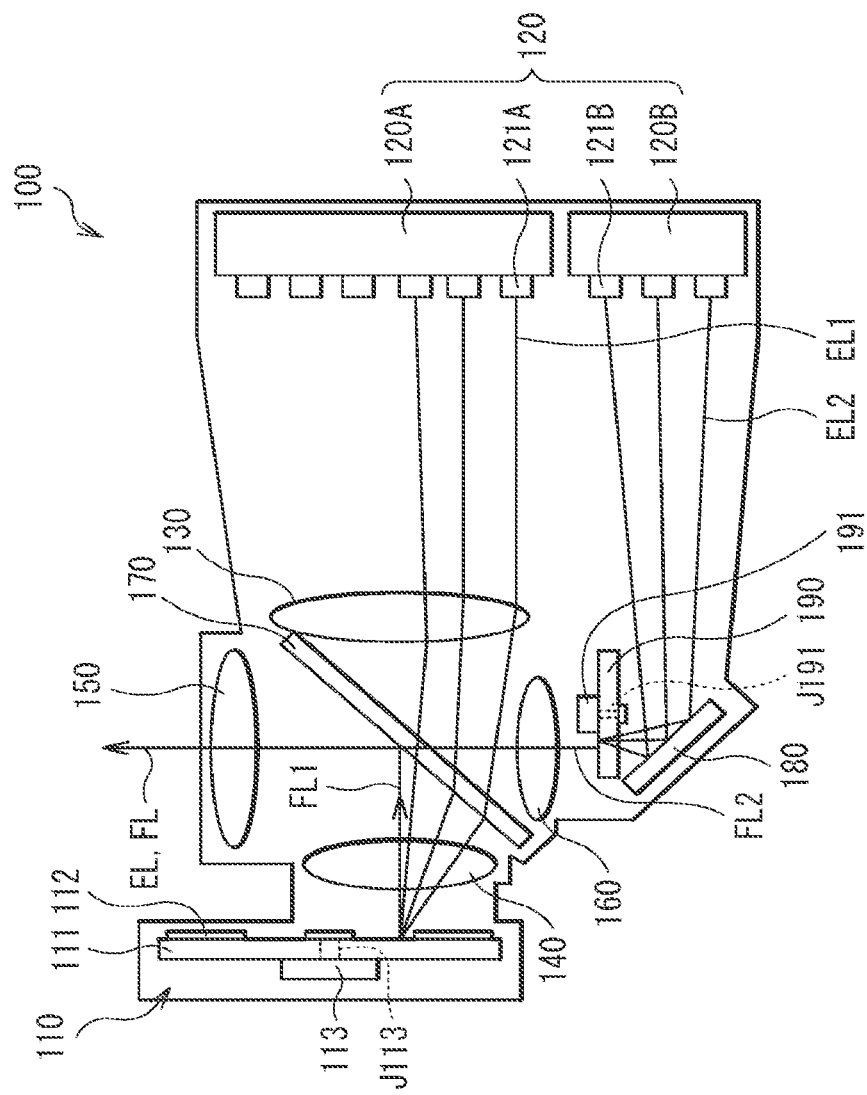
FIG. 9 is a schematic diagram illustrating a configuration example of a light source optical system illustrated in FIG. 8.

The light source apparatus 100 includes a phosphor wheel 110 (wavelength converter), a light source unit 120 that emits excitation light or laser light, lenses 130 to 160, a dichroic mirror 170, a reflecting mirror 180, and a diffuser 190, as illustrated in FIG. 9. The phosphor wheel 110 has a configuration in which a phosphor layer 112 is provided on, for example, a substrate 111 on a disc, and is rotatably supported by a shaft J113. The diffuser 190 is rotatably supported by a shaft J191. The light source unit 120 includes a first laser group 120A and a second laser group 120B. The first laser group 120A includes a plurality of arranged semiconductor laser devices 121A that oscillate excitation light (e.g., a wavelength of 445 nm or 455 nm), and the second laser group 120B includes a plurality of arranged semiconductor laser devices 121B that oscillate blue laser light (e.g., a wavelength of 465 nm). For the sake of convenience, the excitation light oscillated from the first laser group 120A is referred to as EL1, and the blue laser light (hereinafter, referred to simply as blue light) oscillated from the second laser group 120B is referred to as EL2.

The illumination optical system 200 includes, for example, fly-eye lenses 210 (210A, 210B), a polarization converter 220, a lens 230, dichroic mirrors 240A and 240B, reflecting mirrors 250A and 250B, lenses 260A and 260B, a dichroic mirror 270, and polarizing plates 280A to 280C from a position close to the light source apparatus 100A.

The fly-eye lenses 210 (210A, 210B) homogenize illuminance distributions of white light from the light source apparatus 100A. The polarization converter 220 functions to align a polarization axis of incident light in a predetermined direction. For example, light other than P-polarized light is converted into P-polarized light. The lens 230 focuses light from the polarization converter 220 toward the dichroic mirrors 240A and 240B. The dichroic mirrors 240A and 240B selectively reflect light in a predetermined wavelength range and selectively transmit light in other wavelength ranges. For example, the dichroic mirror 240A mainly reflects red light toward the reflecting mirror 250A. Also, the dichroic mirror 240B mainly reflects blue light toward the reflecting mirror 250B. Therefore, green light is mainly transmitted through both the dichroic mirrors 240A and 240B to a reflective polarizing plate 310C (described later) of the image formation unit 300. The reflecting mirror 250A reflects light (mainly red light) from the dichroic mirror 240A toward the lens 260A, and the reflecting mirror 250B reflects light (mainly blue light) from the dichroic mirror 240B toward the lens 260B. The lens 260A transmits light (mainly red light) from the reflecting mirror 250A, and focuses the light on the dichroic mirror 270. The lens 260B transmits light (mainly blue light) from the reflecting mirror 250B, and focuses the light on the dichroic mirror 270. The dichroic mirror 270 selectively reflects green light and selectively transmits light in other wavelength ranges. Here, a red light component of the light from the lens 260A is transmitted. In a case where a green light component is included in the light from the lens 260A, the green light component is reflected toward the polarizing plate 280C. The polarizing plates 280A to 280C include polarizers having a polarization axis in a predetermined direction. For example, in a case where light has been converted to P-polarized light in the polarization converter 220, the polarizing plates 280A to 280C transmit P-polarized light and reflect S-polarized light.

The image formation unit 300 includes reflective polarizing plates 310A to 310C, reflective liquid crystal panels 320A to 320C (optical modulators), and a dichroic prism 330.

The reflective polarizing plates 310A to 310C respectively transmit light of the same polarization axis as the polarization axis of the polarized light from the polarizing plates 280A to 280C (e.g., P-polarized light), and reflects light of another polarization axis (S-polarized light). Specifically, the reflective polarizing plate 310A transmits the P-polarized red light from the polarizing plate 280A toward the reflective liquid crystal panel 320A. The reflective polarizing plate 310B transmits the P-polarized blue light from the polarizing plate 280B toward the reflective liquid crystal panel 320B. The reflective polarizing plate 310C transmits the P-polarized green light from the polarizing plate 280C toward the reflective liquid crystal panel 320C. The P-polarized green light transmitted through both the dichroic mirrors 240A and 240B and incident on the reflective polarizing plate 310C is transmitted through the reflective polarizing plate 310C as it is and enters the dichroic prism 330. Further, the reflective polarizing plate 310A reflects the S-polarized red light from the reflective liquid crystal panel 320A and causes it to enter the dichroic prism 330. The reflective polarizing plate 310B reflects the S-polarized blue light from the reflective liquid crystal panel 320B and causes it to enter the dichroic prism 330. The reflective polarizing plate 310C reflects the S-polarized green light from the reflective liquid crystal panel 320C and causes it to enter the dichroic prism 330.

The reflective liquid crystal panels 320A to 320C perform spatial modulations of red light, blue light, or green light, respectively.

The dichroic prism 330 combines the incident red light, blue light, and green light, and emits the combined light toward the projection optical system 400.

The projection optical system 400, for example, includes a plurality of lenses or the like, although not illustrated. The projection optical system 400 expands the light emitted from the image formation unit 300 and projects the light onto a screen 500. The lens shift mechanism 1 in the above embodiment is applied to the projection optical system 400.

2-2. Application Example 2

Figure 10:
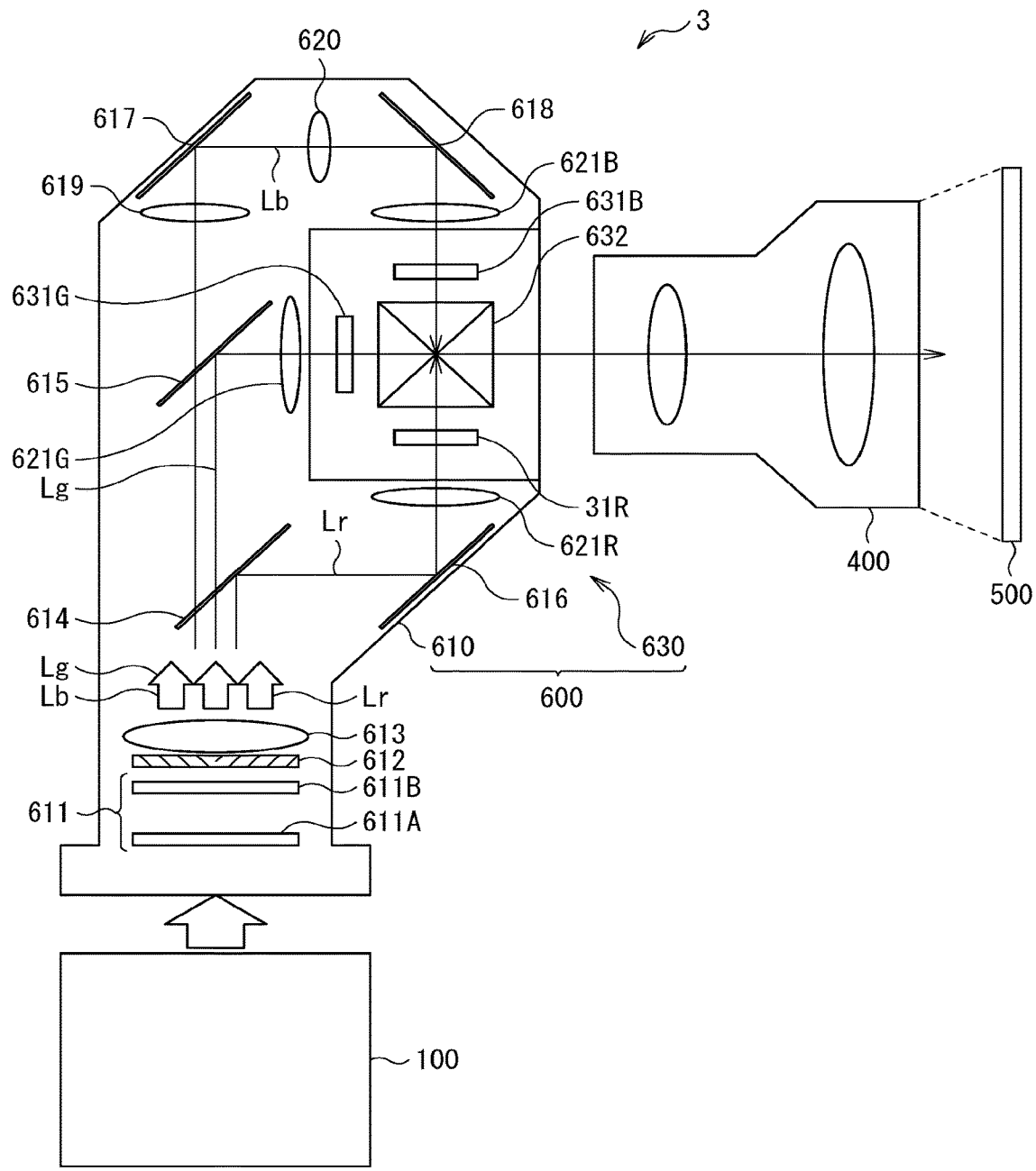
FIG. 10 is a schematic diagram illustrating another example of a configuration of an optical system of a projection display apparatus according to one embodiment of the present disclosure.

FIG. 10 is a schematic diagram illustrating an exemplary configuration of a transmissive 3LCD-type projection display apparatus (projector 3) in which optical modulation is performed by a transmissive liquid crystal panel. The projector 3 includes, for example, the light source apparatus 100, an image generation system 600 including an illumination optical system 610 and an image generator 630, and the projection optical system 400. It is to be noted that the light source apparatus 100 has a configuration similar to that of the light source apparatus 100 in the above application example 1.

The illumination optical system 610 includes, for example, an integrator device 611, a polarization converter 612, and a condenser lens 613. The integrator device 611 includes a first fly-eye lens 611A including a plurality of microlenses arranged two-dimensionally, and a second fly-eye lens 611B including a plurality of microlenses arranged to correspond one by one to the microlenses.

The light (collimated light) entering the integrator device 611 from the light source apparatus 100 is divided into a plurality of light beams by the microlenses of the first fly-eye lens 611A, and forms images on the corresponding microlenses of the second fly-eye lens 611B. The microlenses of the second fly-eye lens 611B each function as a secondary light source, and apply a plurality of collimated light beams having uniform brightness to the polarization converter 612 as incident light.

The integrator device 611, as a whole, has a function of adjusting the incident light applied from the light source apparatus 100 to the polarization converter 612 into uniform brightness distribution.

The polarization converter 612 has a function of making the polarization state of the incident light entering via the integrator device 611 or the like uniform. The polarization converter 612, for example, emits emission light including blue light Lb, green light Lg, and red light Lr, via the lens 150 or the like disposed on the exit side of the light source apparatus 100.

The illumination optical system 610 further includes a dichroic mirror 614 and a dichroic mirror 615, a mirror 616, a mirror 617, and a mirror 618, a relay lens 619 and a relay lens 620, a field lens 621R, a field lens 621G, and a field lens 621B, liquid crystal panels 631R, 631G, and 631B serving as the image generator 630, and a dichroic prism 632.

The dichroic mirror 614 and the dichroic mirror 615 have the property of selectively reflecting color light in a predetermined wavelength range and transmitting light in other wavelength ranges. For example, the dichroic mirror 614 selectively reflects the red light Lr. The dichroic mirror 615 selectively reflects the green light Lg out of the green light Lg and the blue light Lb transmitted through the dichroic mirror 614. The remaining blue light Lb is transmitted through the dichroic mirror 615. Thus, the light emitted from the light source apparatus 100 (white light Lw) is separated into a plurality of color light beams of different colors.

The separated red light Lr is reflected by the mirror 616, collimated by passing through the field lens 621R, and then enters the red light modulating liquid crystal panel 631R. The green light Lg is collimated by passing through the field lens 621G, and then enters the green light modulating liquid crystal panel 631G. The blue light Lb is reflected by the mirror 617 through the relay lens 619 and is further reflected by the mirror 618 through the relay lens 620. The blue light Lb reflected by the mirror 618 is collimated by passing through the field lens 621B, and then enters the liquid crystal panel 631B for modulation of the blue light Lb.

The liquid crystal panels 631R, 631G, and 631B are electrically coupled to an unillustrated signal source (e.g., a PC) that supplies an image signal including image information. The liquid crystal panels 631R, 631G, and 631B modulate incident light on a pixel-by-pixel basis on the basis of the supplied image signals of the respective colors, and generate a red image, a green image, and a blue image, respectively. The light (formed images) of the respective colors modulated are combined by entering the dichroic prism 632. The dichroic prism 632 superimposes and combines the light of the respective colors incident from the three directions, and emits the combined light toward the projection optical system 400.

The projection optical system 400, for example, includes a plurality of lenses or the like, although not illustrated. The projection optical system 400 expands the light emitted from the image generation system 600 and projects it onto the screen 500. The lens shift mechanism 1 in the above embodiment is applied to the projection optical system 400.

Although the present disclosure has been described with reference to the above embodiment and application examples, the present disclosure is not limited to above embodiment, etc., and may be modified in a variety of ways.

Further, although the optical members configuring the projectors 2 and 3 has been specifically described in the above application examples, there is no need to include all the optical members, and another optical member may further be provided. For example, although the above application examples illustrate an exemplary projector using a reflective or transmissive liquid crystal panel (LCD) as an optical modulator, the present disclosure may also be applied to a projector using a digital micromirror device (DMD: Digital Micro-mirror Device) or the like.

It is to be noted that the present disclosure may have the following configurations. According to the present technology having the following configurations, a position of a projection lens is adjusted using an operating unit in which a pair of a main shaft and a countershaft extending in one axial direction perpendicular to an optical axis of the projection lens and disposed to be opposed to each other across a cylindrical housing that holds the projection lens is combined with a pair of elastic bodies parallel to the same one axial direction and having biasing directions opposite to each other. This reduces rattling of the projection lens in a planar direction perpendicular to the optical axis. Therefore, it is possible to improve stability of the image position projected from the projection lens. It is to be noted that the effects described here are not necessarily limitative and may be any of the effects described in the present disclosure.

(1)
A lens shift mechanism including:
a projection lens;
a cylindrical housing that holds the projection lens; and
an operating unit that moves the cylindrical housing in one axial direction perpendicular to an optical axis of the projection lens,
in which the operating unit includes
a pair of a main shaft and a countershaft extending in the one axial direction and disposed to be opposed to each other across the cylindrical housing, and
a pair of elastic bodies provided respectively for the main shaft and the countershaft, the pair of elastic bodies being parallel to the one axial direction and having biasing directions opposite to each other.

(2)
The lens shift mechanism according to (1), in which the pair of elastic bodies have biasing forces different from each other.

(3)
The lens shift mechanism according to (1) or (2), in which
the pair of elastic bodies include a first elastic body and a second elastic body, and
a minimum biasing force of the first elastic body is greater than a sum of a maximum biasing force of the second elastic body and gravitational force applied to a holding member that includes the projection lens and the cylindrical housing and holds the projection lens.

(4)
The lens shift mechanism according to any one of (1) to (3), in which a straight line coupling a first biasing point and a second biasing point biased by the pair of elastic bodies passes near the optical axis of the projection lens.

(5)
The lens shift mechanism according to any one of (1) to (4), in which the operating unit further includes a base provided with a first accommodation portion that accommodates the main shaft and one elastic body provided for the main shaft, a second accommodation portion that accommodates the countershaft and another elastic body provided for the countershaft, and an opening into which the cylindrical housing is inserted.

(6)
The lens shift mechanism according to (5), in which
the first accommodation portion includes a first fixed portion fixed to the base and a first cover moveable in the one axial direction, and
the second accommodation portion includes a second fixed portion fixed to the base and a second cover moveable in the one axial direction.

(7)
The lens shift mechanism according to (5) or (6), in which the opening has a marginal region at least in the one axial direction.

(8)
The lens shift mechanism according to any one of (1) to (7), in which the operating unit includes a first operating unit that moves the cylindrical housing in one direction, and a second operating unit that moves the cylindrical housing in another direction different from the one direction.

(9)
The lens shift mechanism according to (8), in which
the first operating unit and the second operating unit each include a base provided with a first accommodation portion that accommodates the main shaft and the one elastic body, a second accommodation portion that accommodates the countershaft and the other elastic body, and an opening into which the cylindrical housing is inserted, the opening provided on the base of the first operating unit has a marginal region in the one direction, and the opening provided on the base of the second operating unit has a marginal region in the one direction and the other direction.

(10)

The lens shift mechanism according to (8) or (9), further including a lens supporter that holds the cylindrical housing, in which the first operating unit moves the lens supporter in the one direction, and the second operating unit moves the first operating unit together with the lens supporter in the other direction.

(11)

The lens shift mechanism according to (9) or (10), in which the first accommodation portion includes a first fixed portion fixed to the base and a first cover moveable in the one axial direction, the second accommodation portion includes a second fixed portion fixed to the base and a second cover moveable in the one axial direction, a lens supporter that holds the cylindrical housing is fastened to the first cover and the second cover of the first operating unit, and the first operating unit is fastened to the first cover and the second cover of the second operating unit.

(12)

The lens shift mechanism according to any one of (8) to (11), in which an optical axis direction of the projection lens is a Y-axis direction, the one direction is an X-axis direction, and the other direction is the Y-axis direction.

(13)

A projection display apparatus including:

a light source unit;

an image formation unit that includes a plurality of optical units including an optical modulator that modulates light from the light source unit on a basis of an input image signal; and a projection unit that projects image light generated by the image formation unit, the projection unit including a projection lens, a cylindrical housing that holds the projection lens, and an operating unit that moves the cylindrical housing in one axial direction perpendicular to an optical axis of the projection lens, in which the operating unit includes a pair of a main shaft and a countershaft extending in the one axial direction and disposed to be opposed to each other across the cylindrical housing, and a pair of elastic bodies provided respectively for the main shaft and the countershaft, the pair of elastic bodies being parallel to the one axial direction and having biasing directions opposite to each other.

This application claims the benefit of Japanese Priority Patent Application No. 2018-162440 filed with the Japan Patent Office on Aug. 31, 2018, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A lens shift mechanism comprising:

a projection lens;

a cylindrical housing that holds the projection lens; and an operating unit that moves the cylindrical housing in one axial direction perpendicular to an optical axis of the projection lens, wherein the operating unit includes a pair of a main shaft and a countershaft extending in the one axial direction and disposed to be opposed to each other across the cylindrical housing, and a pair of elastic bodies provided respectively for the main shaft and the countershaft, the pair of elastic bodies being parallel to the one axial direction and having biasing directions opposite to each other.

2. The lens shift mechanism according to claim 1, wherein the pair of elastic bodies have biasing forces different from each other.

3. The lens shift mechanism according to claim 1, wherein the pair of elastic bodies comprise a first elastic body and a second elastic body, and a minimum biasing force of the first elastic body is greater than a sum of a maximum biasing force of the second elastic body and gravitational force applied to a holding member that includes the projection lens and the cylindrical housing and holds the projection lens.

4. The lens shift mechanism according to claim 1, wherein a straight line coupling a first biasing point and a second biasing point biased by the pair of elastic bodies passes near the optical axis of the projection lens.

5. The lens shift mechanism according to claim 1, wherein the operating unit further includes a base provided with a first accommodation portion that accommodates the main shaft and one elastic body provided for the main shaft, a second accommodation portion that accommodates the countershaft and another elastic body provided for the countershaft, and an opening into which the cylindrical housing is inserted.

6. The lens shift mechanism according to claim 5, wherein the first accommodation portion includes a first fixed portion fixed to the base and a first cover moveable in the one axial direction, and the second accommodation portion includes a second fixed portion fixed to the base and a second cover moveable in the one axial direction.

7. The lens shift mechanism according to claim 5, wherein the opening has a marginal region at least in the one axial direction.

8. The lens shift mechanism according to claim 1, wherein the operating unit comprises a first operating unit that moves the cylindrical housing in one direction, and a second operating unit that moves the cylindrical housing in another direction different from the one direction.

9. The lens shift mechanism according to claim 8, wherein the first operating unit and the second operating unit each include a base provided with a first accommodation portion that accommodates the main shaft and the one elastic body, a second accommodation portion that accommodates the countershaft and the other elastic body, and an opening into which the cylindrical housing is inserted, the opening provided on the base of the first operating unit has a marginal region in the one direction, and the opening provided on the base of the second operating unit has a marginal region in the one direction and the other direction.

10. The lens shift mechanism according to claim 8, further comprising a lens supporter that holds the cylindrical housing,
 wherein the first operating unit moves the lens supporter in the one direction, and the second operating unit moves the first operating unit together with the lens supporter in the other direction.

11. The lens shift mechanism according to claim 9, wherein
 the first accommodation portion includes a first fixed portion fixed to the base and a first cover moveable in the one axial direction,
 the second accommodation portion includes a second fixed portion fixed to the base and a second cover moveable in the one axial direction,
 a lens supporter that holds the cylindrical housing is fastened to the first cover and the second cover of the first operating unit, and
 the first operating unit is fastened to the first cover and the second cover of the second operating unit.

12. The lens shift mechanism according to claim 8, wherein an optical axis direction of the projection lens is a Y-axis direction, the one direction is an X-axis direction, and the other direction is the Y-axis direction.

13. A projection display apparatus comprising:
 a light source unit;
 an image formation unit that includes a plurality of optical units including an optical modulator that modulates light from the light source unit on a basis of an input image signal; and
 a projection unit that projects image light generated by the image formation unit,
 the projection unit including
 a projection lens,
 a cylindrical housing that holds the projection lens, and
 an operating unit that moves the cylindrical housing in one axial direction perpendicular to an optical axis of the projection lens,
 wherein the operating unit includes
  a pair of a main shaft and a countershaft extending in the one axial direction and disposed to be opposed to each other across the cylindrical housing, and
  a pair of elastic bodies provided respectively for the main shaft and the countershaft, the pair of elastic bodies being parallel to the one axial direction and having biasing directions opposite to each other.

* * * * *